(12) United States Patent
Canino et al.

(10) Patent No.: US 9,074,519 B2
(45) Date of Patent: Jul. 7, 2015

(54) COMBUSTION CHAMBER FOR DIESEL ENGINES WITH INCLINED ENGINE VALVES

(75) Inventors: Gianluca Canino, Orbassano (IT); Marco Cuniberti, Orbassano (IT); Mario Durando, Orbassano (IT); Damiano Micelli, Orbassano (IT)

(73) Assignee: C.R.F. Società Consortile per Azioni, Orbassano (Torino) (IT)

(*) Notice: Subject to any disclaimer, the term of this patent is extended or adjusted under 35 U.S.C. 154(b) by 875 days.

(21) Appl. No.: 13/153,007

(22) Filed: Jun. 3, 2011

(65) Prior Publication Data

US 2012/0037118 A1 Feb. 16, 2012

(30) Foreign Application Priority Data

Aug. 12, 2010 (EP) .................................. 10425275

(51) Int. Cl.
| | |
|---|---|
| *F02B 31/08* | (2006.01) |
| *F02B 23/04* | (2006.01) |
| *F02B 23/06* | (2006.01) |
| *F01L 3/00* | (2006.01) |
| *F02B 3/06* | (2006.01) |
| *F02F 1/42* | (2006.01) |

(52) U.S. Cl.
CPC . *F02B 23/04* (2013.01); *F01L 3/00* (2013.01); *F01L 2003/255* (2013.01); *F01L 2003/256* (2013.01); *F02B 3/06* (2013.01); *F02B 23/0621* (2013.01); *F02B 23/063* (2013.01); *F02B 23/0672* (2013.01); *F02B 2275/14* (2013.01); *F02B 2275/40* (2013.01); *F02F 1/4214* (2013.01); *F02F 1/4235* (2013.01); *Y02T 10/125* (2013.01); *Y02T 10/146* (2013.01)

(58) Field of Classification Search
CPC ............... F02B 31/085; F02B 23/0669; F02B 23/0687; F02F 3/26
USPC .............. 123/295, 308, 193.5, 671, 262, 279, 123/285
See application file for complete search history.

(56) References Cited

U.S. PATENT DOCUMENTS

| | | | | | |
|---|---|---|---|---|---|
| 2,966,145 | A | * | 12/1960 | Froehlich ....................... | 123/665 |
| 3,154,059 | A | * | 10/1964 | Clark, Jr. et al. ............... | 123/301 |
| 3,175,543 | A | * | 3/1965 | Drebes .......................... | 123/269 |
| 3,999,532 | A | * | 12/1976 | Kornhauser .................. | 123/263 |

(Continued)

FOREIGN PATENT DOCUMENTS

| | | |
|---|---|---|
| DE | 10150721 A1 | 4/2003 |
| EP | 1460257 A1 | 9/2004 |

(Continued)

OTHER PUBLICATIONS

European Search Report for corresponding European application No. EP10425275, mailed on Jan. 19, 2011.

*Primary Examiner* — Mahmoud Gimie
*Assistant Examiner* — David Hamaoui
(74) *Attorney, Agent, or Firm* — Heslin Rothenberg Farley & Mesiti P.C.; Victor A. Cardona, Esq.

(57) ABSTRACT

A new architecture of a combustion chamber for a diesel engine allows arranging the engine valves according to an axis inclined with respect to the cylinder axis by an angle greater than 8°, without reducing the swirl ratio obtained at the end of the compression stage.

7 Claims, 7 Drawing Sheets

(56) References Cited

U.S. PATENT DOCUMENTS

| | | | |
|---|---|---|---|
| 4,167,161 A * | 9/1979 | Nakagami | 123/308 |
| 4,259,933 A * | 4/1981 | Nakanishi et al. | 123/307 |
| 4,706,623 A * | 11/1987 | Gadefelt et al. | 123/308 |
| 4,751,902 A * | 6/1988 | August | 123/263 |
| 4,844,025 A * | 7/1989 | Sheaffer | 123/310 |
| 5,101,778 A * | 4/1992 | Fukuo et al. | 123/90.27 |
| 5,138,989 A * | 8/1992 | Fraidl et al. | 123/193.5 |
| 5,257,612 A * | 11/1993 | Smith et al. | 123/661 |
| 5,372,105 A * | 12/1994 | Nagao et al. | 123/193.3 |
| 5,373,820 A * | 12/1994 | Sakamoto et al. | 123/295 |
| 5,445,135 A * | 8/1995 | Feuling | 123/661 |
| 5,634,444 A * | 6/1997 | Matsuki et al. | 123/306 |
| 5,819,700 A * | 10/1998 | Ueda et al. | 123/262 |
| 5,836,284 A * | 11/1998 | Oda et al. | 123/308 |
| 5,873,344 A * | 2/1999 | Kudou et al. | 123/295 |
| 5,983,856 A * | 11/1999 | Oda et al. | 123/308 |
| 5,996,548 A * | 12/1999 | Hellmich | 123/295 |
| 6,047,592 A * | 4/2000 | Wirth et al. | 73/114.77 |
| 6,237,579 B1 * | 5/2001 | Singh | 123/661 |
| 6,267,107 B1 * | 7/2001 | Ward | 123/661 |
| 6,336,438 B1 * | 1/2002 | Durnholz et al. | 123/301 |
| 6,435,159 B1 * | 8/2002 | Craft et al. | 123/298 |
| 6,502,540 B1 * | 1/2003 | Smith | 123/295 |
| 6,604,505 B2 * | 8/2003 | Hellmich | 123/305 |
| 6,647,950 B2 * | 11/2003 | Craft et al. | 123/298 |
| 6,651,614 B2 * | 11/2003 | Flamig-Vetter et al. | 123/301 |
| 6,892,693 B2 * | 5/2005 | Montgomery et al. | 123/276 |
| 7,077,102 B1 * | 7/2006 | Stowe | 123/306 |
| 7,377,238 B2 * | 5/2008 | Ishikawa et al. | 123/43 R |
| 7,434,548 B2 * | 10/2008 | Takahashi et al. | 123/48 B |
| 7,574,986 B2 * | 8/2009 | Ishikawa et al. | 123/78 BA |
| 8,434,442 B2 * | 5/2013 | Mizunuma | 123/145 A |
| 8,627,798 B2 * | 1/2014 | Yamaguchi et al. | 123/276 |
| 2005/0224041 A1 * | 10/2005 | Herrmann et al. | 123/295 |

FOREIGN PATENT DOCUMENTS

| | | |
|---|---|---|
| EP | 1835143 A1 | 9/2007 |
| FR | 2849901 A1 | 1/2003 |
| JP | 2006328997 | 12/2006 |

\* cited by examiner

INTAKE                    COMPRESSION

COMBUSTION CHAMBER FOR DIESEL ENGINES WITH INCLINED ENGINE VALVES

CROSS REFERENCE TO RELATED APPLICATIONS

This application claims priority from European patent application No. EP 10425275.4, filed on Aug. 12, 2010, the entire disclosure of which is incorporated herein by reference.

BACKGROUND OF THE INVENTION

The present invention refers to diesel engines of the type having at least one cylinder defined in a engine block, a cylinder head having a bottom surface delimiting a combustion chamber associated to said cylinder, at least two intake valves and two exhaust associated to said cylinder, which control respective intake and exhaust conduits formed in said cylinder head and ending up on said bottom surface of the cylinder head delimiting the combustion chamber, wherein said surface is a mainly flat surface and orthogonal to the cylinder axis, and wherein said intake and exhaust valves each have a respective valve axis which is inclined with respect to the cylinder axis by an angle greater than 8°.

An engine of this type is known from document DE 101 50 721 A1 or document EP 1 835 143 A1.

In diesel engines of a more conventional type, intake and exhaust valves have their axis inclined with respect to the axis of the cylinder by an angle not greater than 3-4°. The surface of the head delimiting the combustion chamber is a flat surface (the so-called "flame plate") substantially coplanar with the bottom face of the cylinder head. When the piston is at the top dead centre, the combustion chamber is almost entirely defined by a cavity (the so-called "bowl") obtained in the head of the piston.

During the operation of the engine, the air motions—required to guarantee proper mixing of the diesel fuel injected into the combustion chamber and an ensuing ideal combustion—are characterized by a vortex with an axis parallel to the cylinder axis, referred to as "swirl". Such swirl motion is indicated by the arrow SW in FIG. 1 of the attached drawings, which shows—in a plane orthogonal to the cylinder axis—the combustion chamber associated to the cylinder, indicated with reference number 1, into which the two intake conduits A1, A2, and the two exhaust conduits S1, S2 end up. According to an art known art per se, the first intake conduit A1 has a scroll-shaped end, suitable to impart a helical movement (indicated by the arrow C in FIG. 1) to the airflow while the second intake conduit A2 directs the airflow which reaches into the combustion chamber according to a direction tangential with respect to the axis of the combustion chamber. The abovementioned shape of the intake conduits is selected to generate the desired swirl motion SW. Furthermore, in the operation of the engine, during the stage of compression in the cylinder, in which the intake valves are closed, the vorticity of the air motion is determined by the so-called "spin-up" phenomenon due to the fact that the air vortex is pushed into the abovementioned "bowl" during the ascent of the piston. The reduction of the radius of the air vortex in the "bowl" causes, according to the principle of preservation of the quantity of motion, an increase of speed. The swirl is quantitatively represented by the "swirl ratio" (Rs=$\Omega_{eq}$ z/$\Omega_{mot}$ where $\Omega_{eq}$ z is the equivalent rotational speed of the fluid vortex around cylinder axis, intended as the ratio between the angular momentum and the inertia momentum of the mass distribution, while $\Omega_{mot}$ is the rotational speed of the driving shaft).

The variation of the swirl ratio in a conventional diesel engine during the intake and compression stages is illustrated in FIG. 2 in the attached drawings. The diagram in such figure shows that the achievement of the ideal value for the combustion, at 360° of crank angle, is mostly caused by the swirl motion generated by the shape of the intake conduits (see the part of the diagram comprised between 120° and 320°) and for a final part—corresponding to the final compression stage—by the "spin-up" phenomenon.

The "spin-up" is instead relatively low in the case of conventional petrol engines, in which the intake and exhaust valves usually have their axis considerably inclined with respect to the to the axis of the cylinder (according to an angle usually greater than 8°), hence the surface of the cylinder head delimiting the combustion chamber is not a coplanar flat surface at the bottom face of the head, but it is defined by a cavity which forms a considerable part of the volume of the combustion chamber when the piston is at the top dead centre.

In the case of petrol engines, the main air motions that contribute to the ideal turbulence for combustion are made up of a horizontal axis vortex referred to as tumble. FIG. 3 of the attached drawings shows, by way of reference, the abovementioned tumble motions in a cylinder of a petrol engine during the intake step (left part of the figure) and during the compression step (right part of the figure). The views of FIG. 3 are sections according to a dashed line also indicated in such figure, through the axes of an intake valve and of an exhaust valve. Furthermore, such views just illustrate the combustion chamber, i.e. the part comprised between the surface of the chamber defined by the cylinder head and the top surface of the piston (which is illustrated at a higher position in the right part of the figure).

The different inclination of the engine valves in diesel engines and in petrol engines gives rise to complications when constructing engines, hence complicating the joining of the components and the construction lines as well as assembling such engines.

The aim of the present invention is that of providing a new shape of the combustion chamber for diesel engines capable of allowing standardising—at least to a given extent—the architecture of such engines with that of petrol engines, so as to allow considerable simplification and reduction of costs when manufacturing and assembling such engines.

According to the invention, such object is attained due to the characteristics indicated in the attached claim 1. Further preferred and advantageous characteristics of the invention are indicated in the attached dependent claims.

BRIEF DESCRIPTION OF THE DRAWINGS

Now, the invention shall be described with reference to the attached drawings, purely provided by way of non-limiting example, wherein.

DETAILED DESCRIPTION OF THE INVENTION

Figure 1:
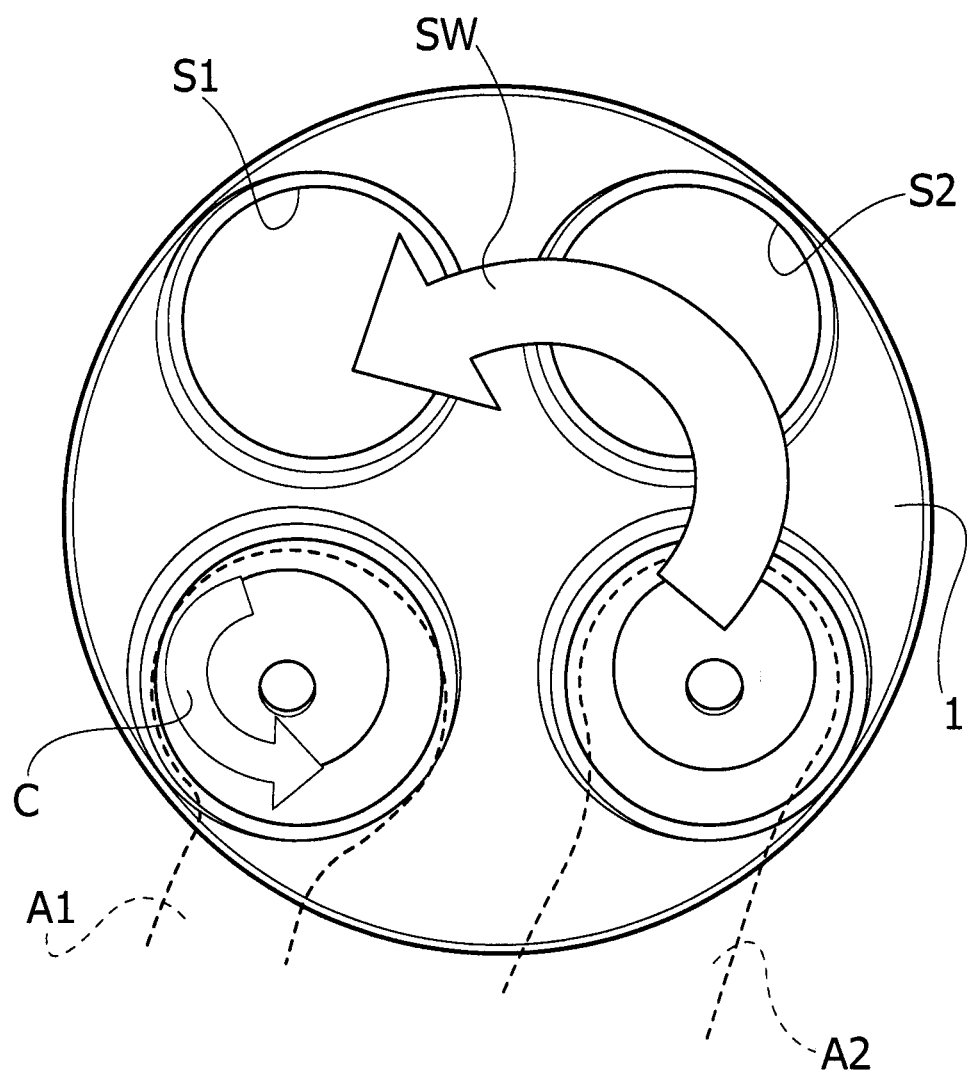
FIG. 1, already described above, illustrates the combustion chamber of a conventional diesel engine, FIG. 2, already described above, illustrates the variation of the swirl ratio in a conventional diesel engine, FIG. 3, already described above, illustrates the tumble motions in a conventional petrol engine.
Figure 4:
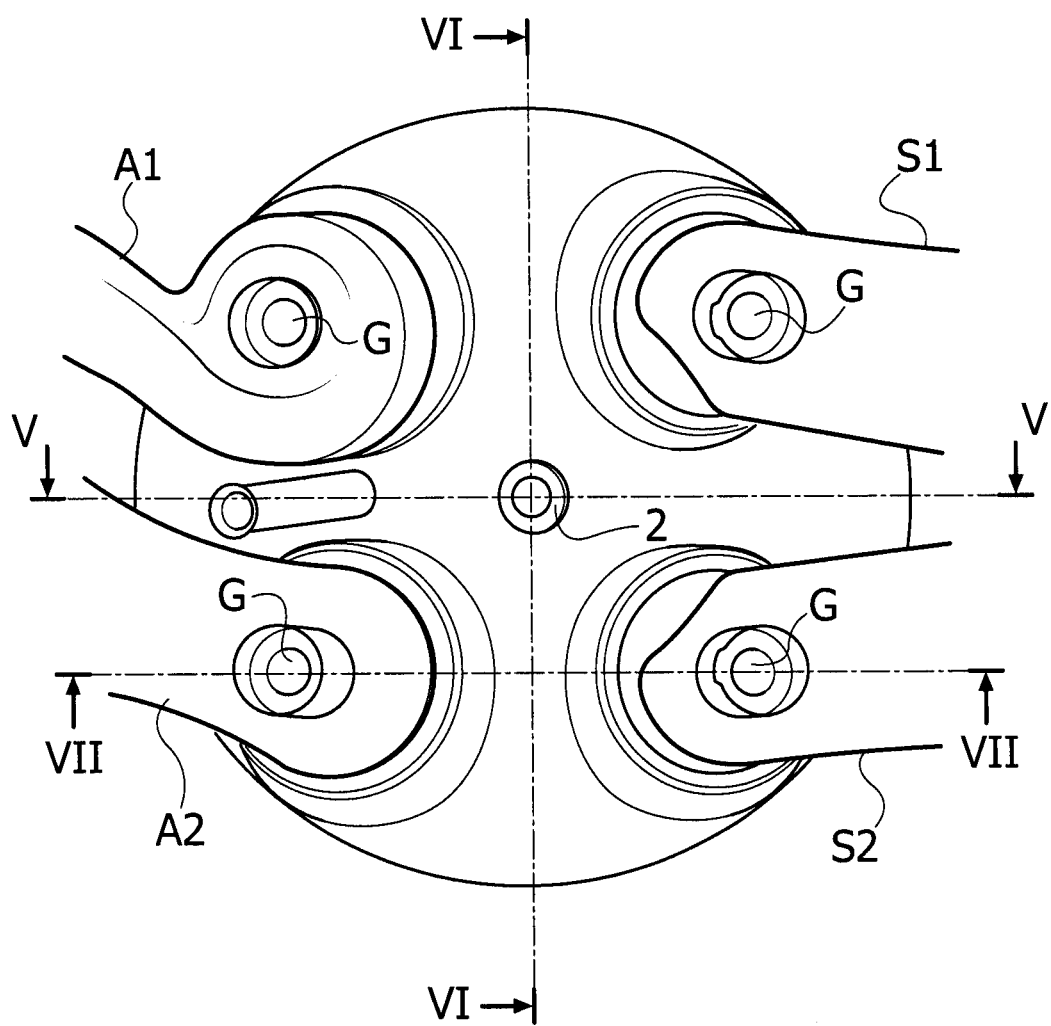
FIG. 4 is a view in a plane orthogonal to the axis of the cylinder of the combustion chamber according to the invention.

Referring to FIG. 4 of the attached drawings, in such figure the parts common with those of FIG. 1 are indicated using the same reference number.

Figure 7:
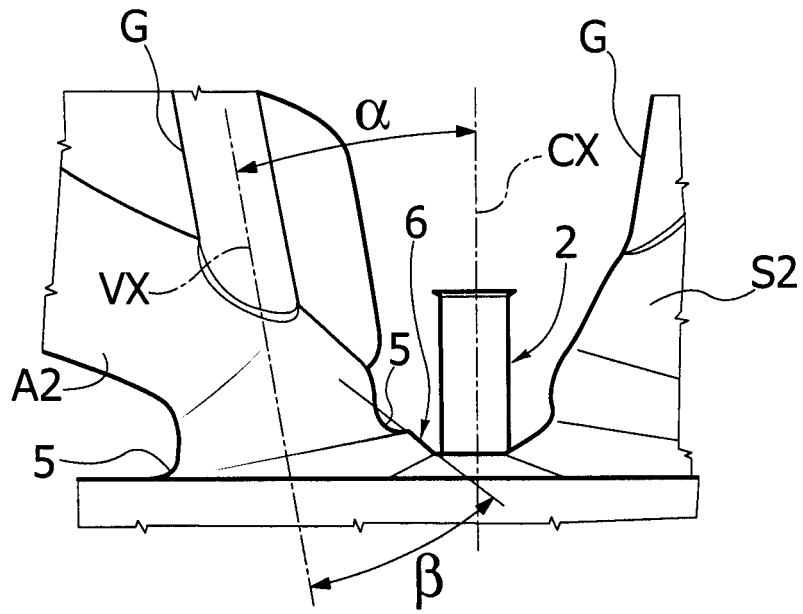
FIG. 7 is a further view according to line VII-VII of FIG. 4.

Even in the case of the combustion chamber according to the invention two intake conduits and two exhaust conduits are provided for. The two intake conduits A1, A2 have a conventional shape, one having a scroll-shaped end part, the other having a tangential end part with respect to the cylinder axis. The exhaust conduits S1, S2 also have a conventional shape. FIG. 4 shows—also schematically—the seat 2 at the centre of the combustion chamber, for fuel injector (visible in FIG. 8 and indicated with reference number 3 therein). The seat 4 for the glow plug is also shown. Lastly, the tubular guide portions G of the stems of the intake and exhaust valves, VA1, VA2 and VS1, VS2, which have the conventional mushroom shape, with the bottom heads which are shown in FIG. 8 and which, in the closed condition of the valves, lay against respective valve seats defined by the edges 5 of the ends of the conduits A1, A2, S1, S2 which end up in the combustion chamber, are shown in FIG. 4 and FIG. 7.

Figure 5:
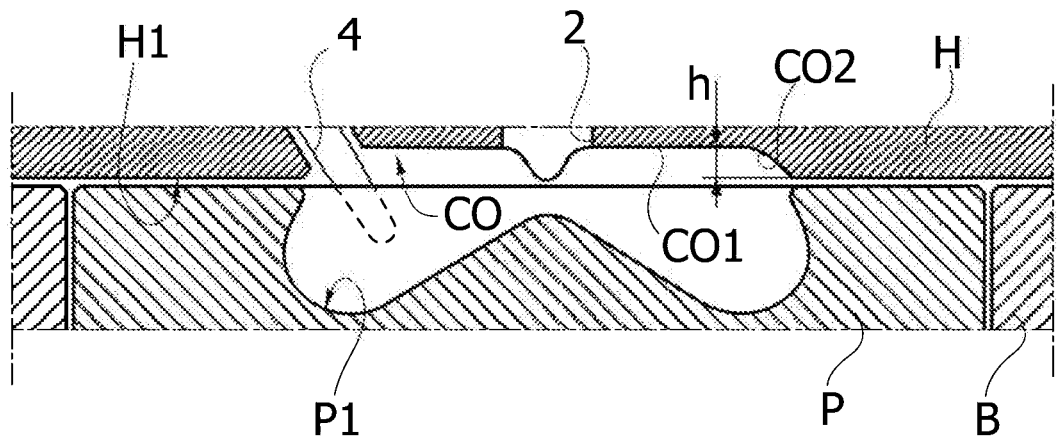
FIGS. 5, 6 are sectional views according to lines V-V and VI-VI of FIG. 4.
Figure 6:
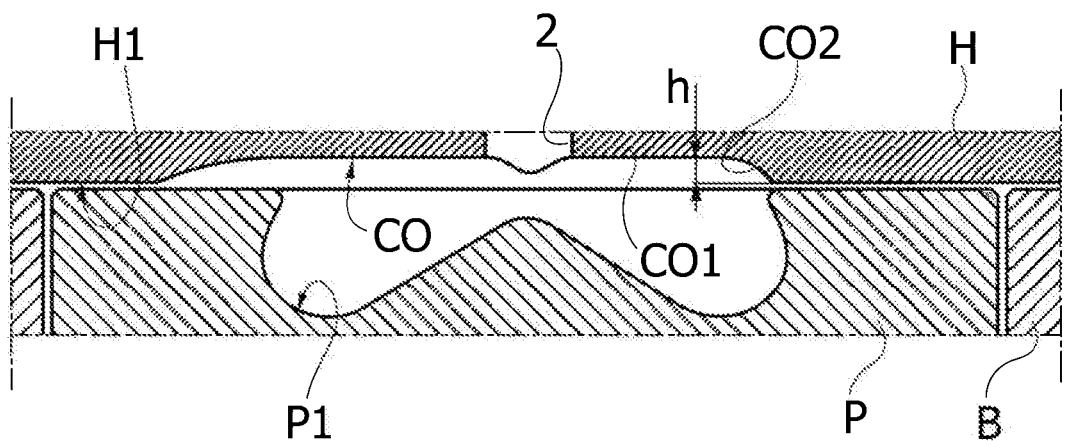

Lastly, in FIGS. 5, 6, reference P is used to indicate the piston slidable in the engine cylinder (which is also illustrated in the top dead centre in such figures), while references B and H respectively indicate the body of the engine block in which the cylinder and the cylinder head, whose bottom surface is indicated with H1 (also see FIG. 8), is obtained. The cavity or bowl formed in the head of the piston is indicated with reference P1.

A main characteristic of the engine according to the invention lies in the fact that both the intake valves and the exhaust valves have their axis VX (FIG. 7) which is inclined with respect to the axis CX of the cylinder by an angle α greater than 8°. Such inclination of the valves forces the creation of large recesses in the cylinder head having the drawback of breaking the swirl vortex during the compression stage, hence jeopardizing the "spin-up" effect. An indicatively frustoconical-shaped combustion chamber was created in the cylinder head in order to overcome this phenomenon. Therefore, in the engine according to the invention, the combustion chamber is defined, when the piston is at the top dead centre (see FIGS. 5, 6) not only by the bowl P1 (which might be much less deep with respect to the conventional shape), but also by a substantially frusto-conical cavity, indicated in its entirety in FIGS. 5, 6 with reference CO and obtained in the bottom surface H1 of the cylinder head.

Figure 8:
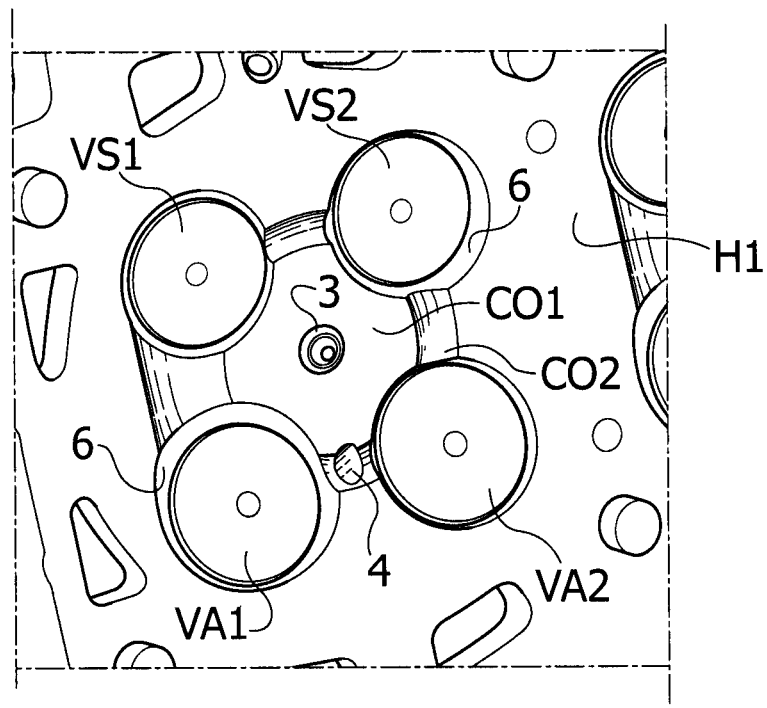
FIG. 8 is a perspective view of the bottom surface of the cylinder head defining the combustion chamber according to the invention.

More precisely, referring to the illustrated embodiment, the cavity CO has a circular main central portion, indicated with CO1 in FIG. 8, which is flat, parallel to the flat bottom surface H1 of the head H and spaced therefrom by a height h (see FIG. 5, 6). The flat circular central portion CO1 of the cavity CO is joined to the bottom surface H1 of the head by an annular portion CO2, substantially conical, which more precisely has a slightly rounded or arched profile, dome-like.

The combustion chamber thus defined allows the formation of swirl motions during the intake stage, but the "spin-up" effect, crucial for the achievement of the ideal end swirl value, is considerably low. To overcome the drawback, the intake and exhaust conduits and the surfaces that join the ends thereof to the bottom surface of the head are made in a manner to form an even more intense swirl motion, enough to achieve the ideal value, which—in the conventional engines—is attained after compression, right from the intake stage. Such characteristic is clearly illustrated in FIG. 7 (in which the cavities and the conduits of the head have been shown as solid parts), with reference to the intake conduit A2, whose end edge 5, defining the seat for the respective valve VA2, is joined to the bottom surface H1 of the head and to the surface of the cavity CO of the combustion chamber (see FIG. 8) through a concentric tapered annular surface 6 with the valve axis VX and forming—with such axis—an angle β whose value may vary between 0° (cylindrical operation) and 60°. The angle β may also be different as regards with the main intake conduit A1 and the secondary intake conduit A2, and same case applies for the exhaust conduits with respect to each other and with respect to the intake conduits. The choice of such angles allows modulating the final value of the swirl at will.

Figure 2:
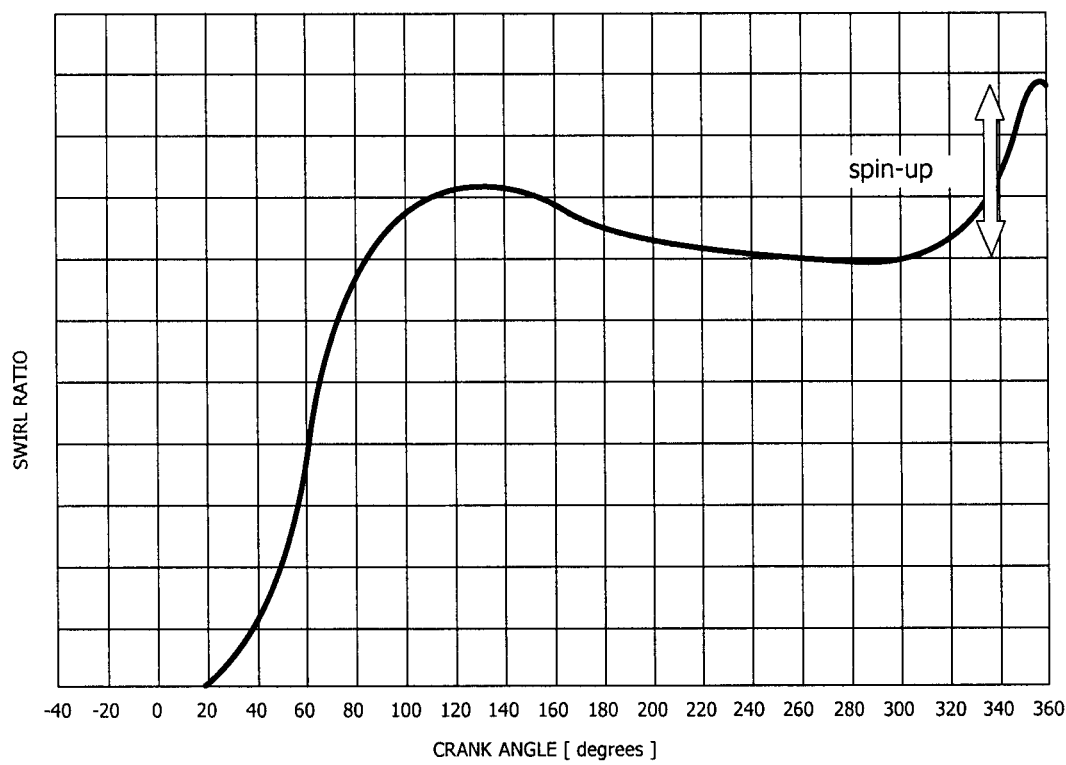
Figure 3:
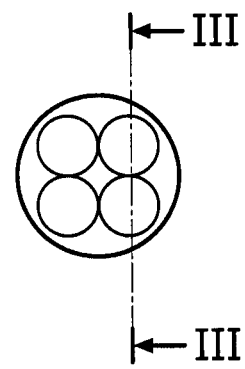
Figure 3:
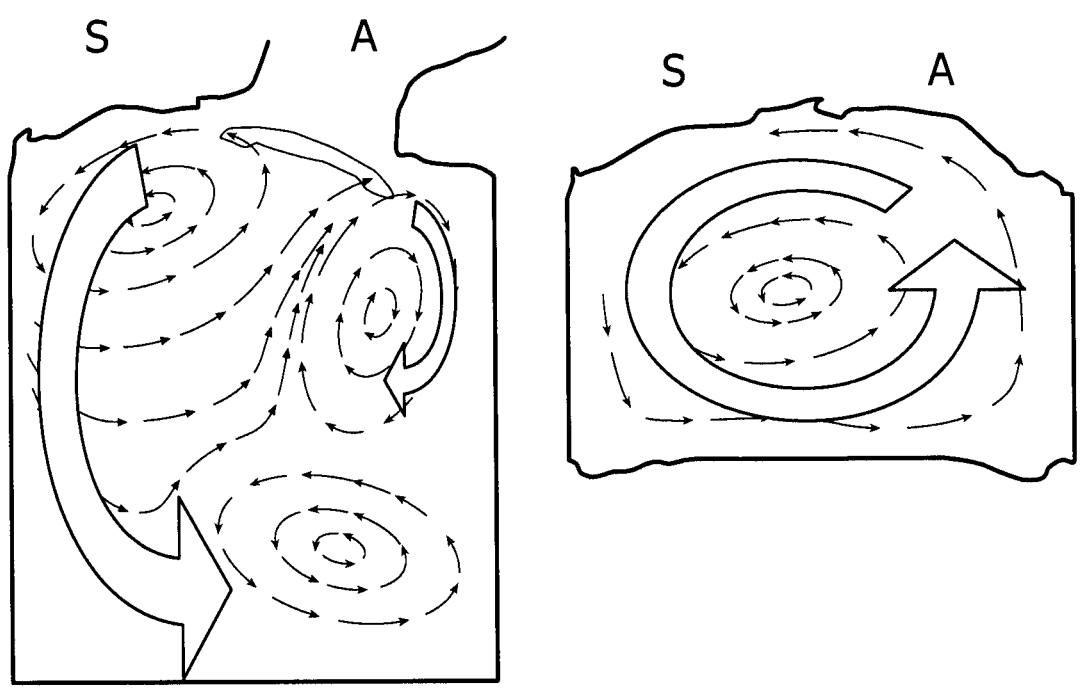
Figure 9:
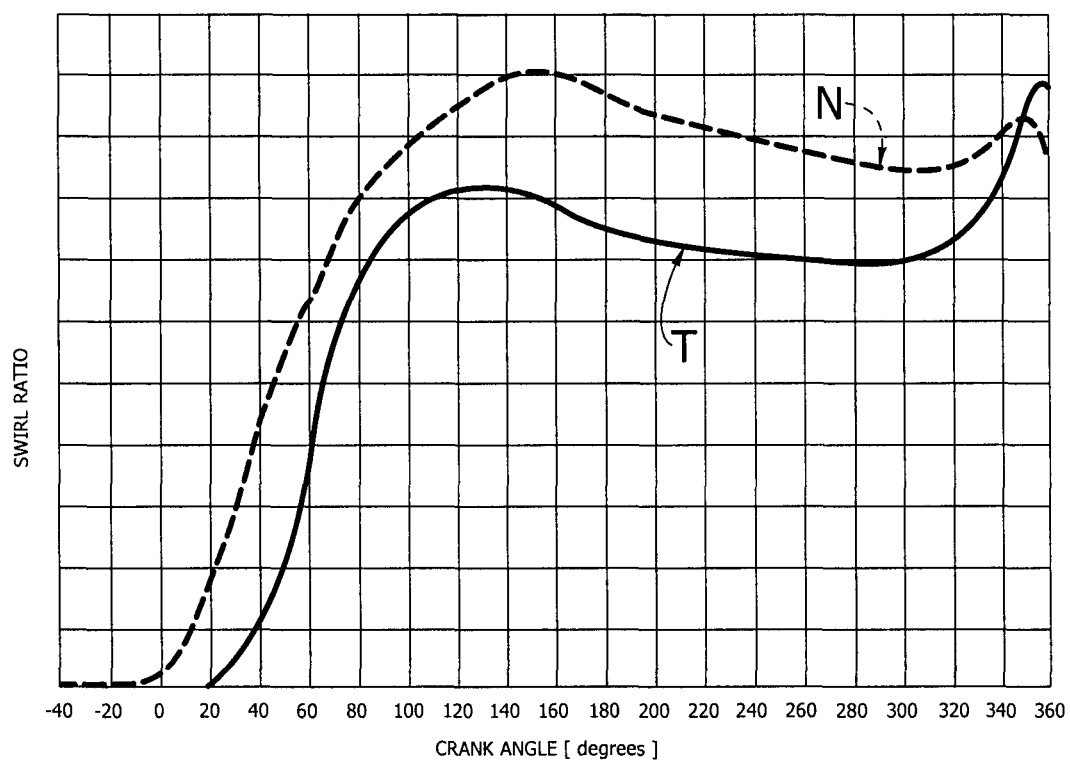
FIG. 9 is a diagram showing the variation of the swirl ratio that occurs in the case of the combustion chamber according to dimensions compared to that of a conventional diesel engine.

In FIG. 9, line T indicates the diagram previously illustrated in FIG. 2, which shows the variation of the swirl ratio in a conventional diesel engine, while line N shows the variation of the swirl ratio in the engine according to the invention. As previously indicated, the engine according to the invention is capable of achieving at the end of the compression stage a swirl ratio value substantially similar, in spite of the fact that the "spin-up" effect is almost absent, due to the increase of the swirl effect during the intake stage. As indicated, such increase is due to the specific shape of the combustion chamber and the joining surfaces 6 described above. At the same time, the arrangement of valves inclined according to angles similar to those used for petrol engines allows simplifying and standardising the manufacture of the diesel engine with respect to that of the petrol engine. This is due not only to the possibility of using the same architecture of the cylinder head for petrol engines and for diesel engines, but also standardise the system of actuating valves with ensuing use of the same components. The diesel engine according to the invention, due to the previously described shape, has a considerably smaller overall height with respect to a conventional engine. Actually, the cylinder head and the valves actuation system, after selecting the valve lift value, are more compact in height, due to the inclination of the valves. The fact that part of the combustion chamber is obtained in the cylinder head allows reducing the height of the bowl in the piston. Hence, the piston acquires a lower compression height (pin axis—piston top surface distance) and a lower weight. These factors have a direct (in the case of compression height) or indirect (in the case of height) impact on the reduction of the height of the engine block. Thus, the invention allows attaining considerable advantages from various points of view.

Naturally, without prejudice to the principle of the invention, the construction details and the embodiments may widely vary with respect to what has been described and illustrated purely by way of example, without departing from the scope of protection of the present invention.

What is claimed is:

1. A diesel engine comprising:
   at least one cylinder defined in an engine block,
   a cylinder head having a bottom surface delimiting a combustion chamber associated to said cylinder,
   at least two intake valves and two exhaust valves associated to said cylinder, said at least two intake valves and two exhaust valves controlling respective intake and exhaust conduits formed in said cylinder head and ending up on said bottom surface of the cylinder head delimiting the combustion chamber, said intake and exhaust valves each having a respective valve axis which is inclined with respect to a cylinder axis of the at least one cylinder by an angle greater than 8°, said bottom surface comprising:

a first flat surface portion orthogonal to said cylinder axis and located centrally in the cylinder, a second flat surface portion orthogonal to said cylinder axis and spaced from said first flat surface portion in a direction toward the cylinder, an imaginary circle orthogonal to and centered on said cylinder axis, a plurality of side surface portions, each tracing an arc of the imaginary circle, said plurality of side surface portions partially defining the perimeter of said first flat surface portion, a plurality of holes corresponding to said intake conduits and said exhaust conduits, said plurality of holes defining a remainder of the perimeter of said first flat surface portion, said plurality of holes intersected by the imaginary circle, said first flat surface portion connected to said second flat surface portion through said plurality of side surface portions, and said side surface portions having a rounded or an arched shape curving downwardly from said first flat surface portion to said second flat surface portion.

2. Diesel engine according to claim 1, wherein each of said intake and exhaust conduits has an end edge coaxial with the axis of the respective valve, serving as a seat for the head of the valve, and wherein said edge is joined with the bottom surface of the head through a tapered annular surface coaxial with the valve axis and forming with such axis an angle comprised between 0° and 60°.

3. Diesel engine according to claim 2, wherein each of said intake and exhaust conduits having an inclination angle of said tapered portion of a value configured to generate, during the operation of the engine, during the intake stage in the cylinder, an increase of the swirl effect which compensates the lower "spin-up" effect at the end of the compression stage due to the fact that a considerable portion of the volume of the combustion chamber is formed in the cylinder head.

4. A method for use in forming the diesel engine of claim 2 further comprising selecting for each of said intake and exhaust conduits a value of an inclination angle of said tapered portion in such a manner to generate, during the operation of the engine, during the intake stage in the cylinder, an increase of the swirl effect which compensates the lower "spin-up" effect at the end of the compression stage due to the fact that a considerable portion of the volume of the combustion chamber is formed in the cylinder head.

5. The engine of claim 1 wherein said perimeter intersects each of said intake conduits and said exhaust conduits at a point on a conduit circle forming each of said intake conduits and said exhaust conduits such that said perimeter is about aligned with a center of said conduit circle.

6. The engine of claim 1 wherein each of said intake conduits and said exhaust conduits is connected to said remainder and said bottom by a concentric tapered annular joining surface extending around each of said intake conduits and said exhaust conduits.

7. The engine of claim 1 wherein said perimeter is located radially inwardly toward an axis of said cylinder compared to outer radial extents of said intake conduits and said exhaust conduits.

* * * * *